United States Patent
Dabney et al.

(10) Patent No.: US 7,284,792 B1
(45) Date of Patent: Oct. 23, 2007

(54) CUSHION SYSTEM FOR MULTI-USE CHILD SAFETY SEAT

(75) Inventors: Richard W. Dabney, Tanner, AL (US); Susan V. Elrod, Huntsville, AL (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 461 days.

(21) Appl. No.: 11/047,342

(22) Filed: Jan. 28, 2005

(51) Int. Cl.
*B60N 2/42* (2006.01)

(52) U.S. Cl. .......................... 297/216.11; 297/219.12; 297/452.41

(58) Field of Classification Search ............ 297/219.12, 297/250.1, 217.3, 452.41, 284.6, DIG. 3, 297/468, 484, 216.11; 5/603, 655.3
See application file for complete search history.

(56) References Cited

U.S. PATENT DOCUMENTS

| | | |
|---|---|---|
| 2,720,911 A | 10/1955 | Lantz |
| 2,805,076 A | 9/1957 | Thomas |
| 3,116,069 A | 12/1963 | Dostal |
| 3,944,241 A | 3/1976 | Epelbaum |
| 4,113,306 A | 9/1978 | von Wimmersperg |
| 4,500,133 A | 2/1985 | Nakao et al. |
| 4,620,711 A | 11/1986 | Dick |
| 4,632,409 A | 12/1986 | Hall et al. |
| 4,641,844 A | 2/1987 | Mar et al. |
| 4,647,054 A | 3/1987 | Chong |
| 4,679,804 A | 7/1987 | Johnson |
| 4,685,688 A | 8/1987 | Edwards |
| 4,750,783 A | 6/1988 | Irby et al. |
| 4,762,331 A | 8/1988 | Tucker et al. |
| 4,768,795 A | 9/1988 | Mar |
| 4,786,064 A | 11/1988 | Baghdasarian |
| 4,789,202 A * | 12/1988 | Alter .................. 297/284.6 |
| 4,822,064 A | 4/1989 | Hunter |
| 4,828,281 A | 5/1989 | Sanchas |
| 4,832,354 A | 5/1989 | LaFreniere |
| 4,834,403 A | 5/1989 | Yamus et al. |
| 4,872,693 A | 10/1989 | Kennel |
| 4,874,182 A | 10/1989 | Clark |
| 4,878,680 A | 11/1989 | Molnar |
| 4,946,180 A | 8/1990 | Baer |
| 4,989,888 A | 2/1991 | Qureshi et al. |
| 5,104,134 A | 4/1992 | Cone |
| 5,149,113 A | 9/1992 | Alldredge |
| 5,188,380 A | 2/1993 | Tucek |
| 5,234,224 A | 8/1993 | Kim |
| 5,277,472 A | 1/1994 | Freese et al. |
| 5,292,175 A * | 3/1994 | Artz .................. 297/250.1 |
| 5,360,221 A | 11/1994 | Chai |
| 5,398,951 A | 3/1995 | Ryu |
| 5,431,478 A | 7/1995 | Noonan |
| 5,478,096 A | 12/1995 | Ting |

(Continued)

*Primary Examiner*—Milton Nelson, Jr.
(74) *Attorney, Agent, or Firm*—James J. McGroary; Peter J. Van Bergen

(57) ABSTRACT

A cushion system for use with a child safety seat has a plurality of bladders assembled to form a seat cushion that cooperates with the seat's safety harness. One or more sensors coupled to the safety harness sense tension therein and generate a signal indicative of the tension. Each of the bladders is individually pressurized by a pressurization system to define a support configuration of the seat cushion. The pressurization system is disabled when tension in the safety harness has attained a threshold level.

21 Claims, 2 Drawing Sheets

U.S. PATENT DOCUMENTS

| | | |
|---|---|---|
| 5,499,831 A | 3/1996 | Worth et al. |
| 5,516,188 A * | 5/1996 | Bruhnke et al. ............ 297/129 |
| 5,562,548 A | 10/1996 | Pinch et al. |
| 5,595,393 A | 1/1997 | Batten |
| 5,676,386 A | 10/1997 | Huang |
| 5,707,106 A | 1/1998 | Clark |
| 5,823,547 A | 10/1998 | Otobe et al. |
| 5,893,606 A | 4/1999 | Chiang |
| 5,947,555 A | 9/1999 | Welsh, Jr. et al. |
| 6,070,890 A | 6/2000 | Haut et al. |
| 6,099,022 A | 8/2000 | Pring |
| 6,179,383 B1 * | 1/2001 | Ochi ....................... 297/250.1 |
| 6,237,995 B1 | 5/2001 | Dierickx |
| 6,250,654 B1 | 6/2001 | Willis |
| 6,286,844 B1 | 9/2001 | Cone, II et al. |
| 6,302,412 B1 | 10/2001 | Worth et al. |
| 6,331,032 B1 | 12/2001 | Haut et al. |
| 6,367,821 B2 | 4/2002 | Thiele |
| 6,409,205 B1 | 6/2002 | Hapst et al. |
| 7,156,467 B2 * | 1/2007 | Kimmig ................ 297/452.41 |
| 2002/0060444 A1 | 5/2002 | Cote |
| 2002/0063450 A1 | 5/2002 | Washizuka et al. |
| 2002/0074835 A1 | 6/2002 | Chalender |
| 2003/0015894 A1 | 1/2003 | Bargery et al. |

* cited by examiner

CUSHION SYSTEM FOR MULTI-USE CHILD SAFETY SEAT

ORIGIN OF THE INVENTION

The invention was made by employees of the United States Government and may be manufactured and used by or for the Government for governmental purposes without the payment of any royalties.

BACKGROUND OF THE INVENTION

1. Field of the Invention

This invention relates to child safety seats. More specifically, the invention is adjustable cushion system for use with a child safety seat designed for a variety of uses.

2. Description of the Related Art

Over the years, the child safety seat has evolved from designs used exclusively in a vehicle to designs that provide for multiple uses. More specifically, today's child safety seats include a variety of mechanisms and/or attachments that allow the seat to be adapted for a variety of uses to include, for example, a car seat, a stroller, a high chair, a rocker, a bed, etc. In general, each adaptation changes the orientation of the seat to position the child sitting therein in one of a recumbent orientation, an upright orientation, or something in between. However, while seat orientations change, there is no mechanism to adjust the support provided by the seat as the conventional child safety seat comprises a foam-backed seat cushion fitted over a rigid frame.

SUMMARY OF THE INVENTION

Accordingly, it is an object of the present invention to provide a cushion system for a multi-use child safety seat.

Another object of the present invention is to provide a child safety seat cushion system that can be configured to provide a variety of support configurations in accordance with various orientations of the child safety seat.

Still another object of the present invention is to provide a child safety seat cushion system that can be configured to provide a variety of support configurations to thereby keep a child comfortable.

Other objects and advantages of the present invention will become more obvious hereinafter in the specification and drawings.

In accordance with the present invention, a cushion system for use with a child safety seat has a plurality of bladders assembled to form a seat cushion. The seat cushion is adapted to be positioned in a child safety seat equipped with a safety harness and cooperate with the safety harness so that a child sitting on the seat cushion can be secured by the safety harness. One or more sensors are coupled to the safety harness to sense tension therein and generate a signal indicative of the tension. Each of the bladders is individually pressurized by a pressurization system to define a support configuration of the seat cushion. The pressurization system is coupled to the sensors and is responsive to their signals. Specifically, the pressurization system is disabled when the signal indicates that the tension in the safety harness has attained a threshold level.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
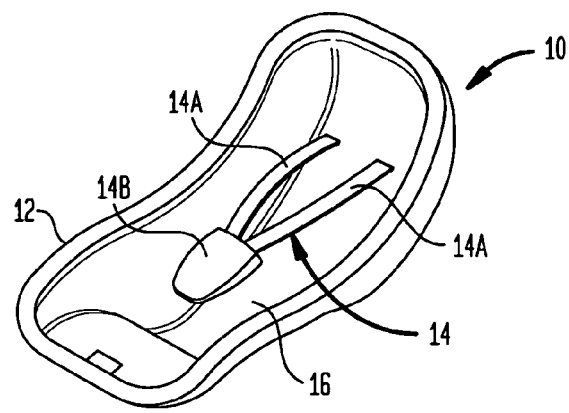
FIG. 1 is a perspective view of a conventional child safety seat.

Referring now to the drawings, and more particularly to FIG. 1, a conventional child safety seat is shown and referenced generally by numeral 10. Child safety seat 10 is representative of any child safety seat design defined by a rigid seat body 12 and a harness 14 having straps 14A pulled over a child's shoulders and upper body and locked to seat body 12 via a lockable coupling 14B. A conventional foam/fabric seat cushion 16 can be provided on seat body 12. It is to be understood that the present invention is in no way limited by the design of child safety seat 10 and that the present invention can be incorporated into any type of child safety seat. For example, seat body 12 can be made from metal, molded plastic, or a combination of metal and molded plastic. The particular configuration of seat body 12 does not limit the present invention. Harness 14 can be configured in a variety of other ways and also does not limit the present invention. Seat cushion 16 can be included or eliminated when using the present invention.

Figure 2:
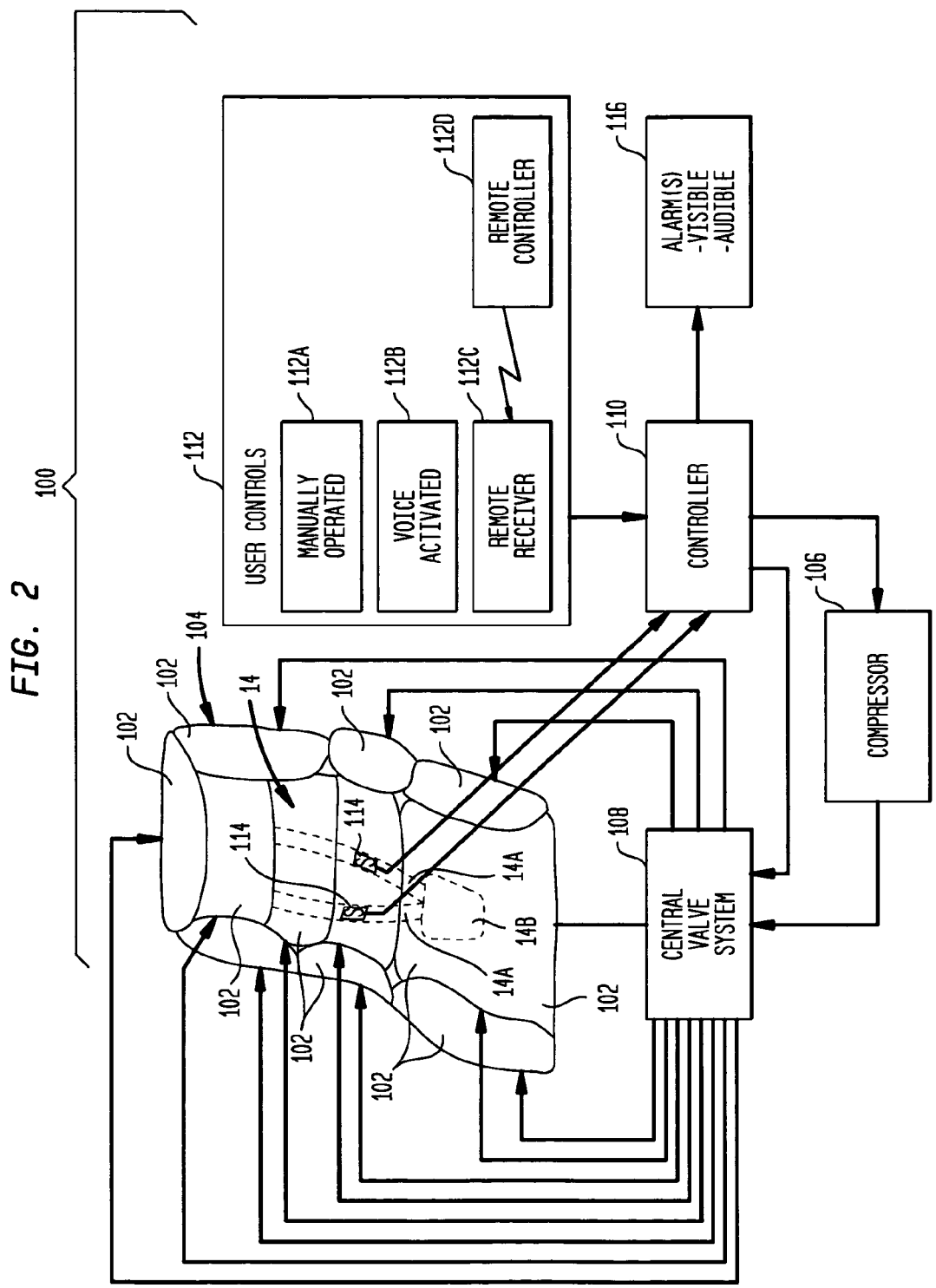
FIG. 2 is a schematic view of the cushion system for a child safety seat in accordance with an embodiment of the present invention.

Referring now to FIG. 2, a cushion system for use with a child safety seat (e.g., seat 10) is shown and is referenced generally by numeral 100. It is to be understood that cushion system 100 can be used with any existing child safety seat or can be incorporated into the structure of any new child safety seat. Although not a requirement of the present invention, it will be assumed herein that cushion system 100 will be used with a child safety seat that is adaptable to multiple uses such as a car seat, stroller, high chair, bed, rocker, etc. In general, cushion system 100 is designed to keep a child (positioned therein) comfortable and properly supported regardless of the safety seat use and orientation.

Cushion system 100 has a plurality of bladders 102 that, when joined or assembled together, form a seat cushion 104 shaped to substantially fit within the confines of a child safety seat. Each of bladders 102 can be individually filled or pressurized with a fluid. For reasons of simplicity and safety, it is preferred that the fluid is air. In general, several bladders 102 will be used to define the sides of seat cushion 104, and several bladders 102 will be used to define the central portion of seat cushion 104. For example, individual bladders 102 can be provided in the regions of seat cushion 104 that support the head, neck, upper body and lower body regions of a child. However, it is to be understood that the number of bladders 102 used to define seat cushion 104 can be more or less than that shown. Likewise, the shape of each of bladders 102 can be varied without departing form the scope of the present invention. Furthermore, the particular construction of bladders 102 is not a limitation of the present invention provided each of bladders 102 can contain a pressurizing fluid.

Each of bladders 102 is individually filled or pressurized by a compressor 106 that supplies pressurized air to a central valve system 108 that, in turn, is controlled by a controller 110. Compressor 106 is any conventional low-pressure air compressor, a variety of which are well known in the art. Central valve system 108 essentially defines a bank of controllable valves, each of which can be positioned to (i) transfer pressurized air from compressor 106 to a particular one of bladders 102, (ii) seal the particular one of bladders 102, or (iii) allow the particular one of bladders 102 to vent or de-pressurize. Central valve system 108 can also include a pressure sensor (not shown) for each valve thereof in order to measure the pressure within each of bladders 102.

Controller 110 controls on/off operation of compressor 106 and issues instructions to central valve system 108 in order to pressurize bladders 102 such that seat cushion 104 defines a particular support configuration. For example, when a child safety seat equipped with cushion system 100 places a child in a recumbent position for sleeping, bladders 102 may be moderately pressurized to define a "soft and cozy" support configuration. If the child safety seat equipped with cushion system 100 places the child upright (e.g., to eat), bladders 102 in the head, neck and back regions may have their pressures increased to keep a child sitting forward and upright. However, it is to be understood that these are merely exemplary situations and that the particular bladder pressurizations and resulting support configurations, as well as the number thereof, are not limitations of the present invention.

Instructions provided by controller 110 can selected from pre-programmed and stored instruction sets, one of which is selected at any given time via user controls 112 coupled to controller 110. For example, each pre-programmed instruction set could define a set of pressures for bladders 102. The set of pressures correspond to a particular support configuration for seat cushion 104 which, in turn, could correspond to a particular orientation and use of a child safety seat using cushion system 100. The pre-programmed sets could be defined at a factory or could be defined and/or supplemented by a parent or caregiver via user controls 112. In either case, a pre-programmed set is selected via user controls 112. The sets can be defined simply by a child safety seat's use, e.g., car set, rocker, etc. Additionally or alternatively, a support configuration for seat cushion 104 can be manually entered via user controls 112 so that a child with special needs or desires can be accommodated. User controls 112 can include one or more of manually-operated controls 112A, voice-activated controls 112B, and a remote receiver 112C for receiving instructions transmitted wirelessly from a remote controller 112D.

Figure 3A:
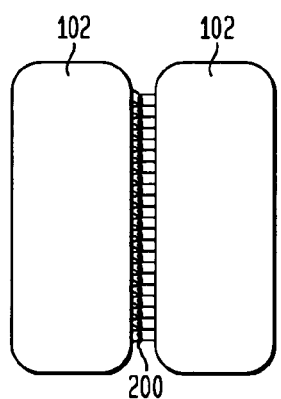
FIG. 3A is a side view of two bladders joined by a hook-and-loop fastener system.
Figure 3B:
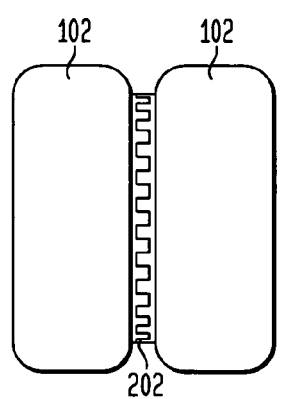
FIG. 3B is a side view of two bladders joined by a zipper.
Figure 3C:
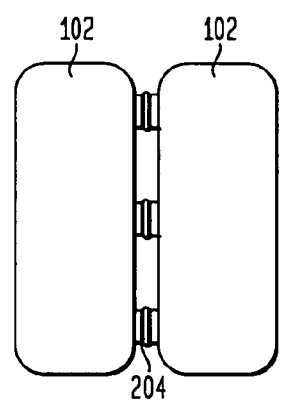
FIG. 3C is a side view of two bladders joined by snaps.

Since seat cushion 104 must cooperate with a child safety seat's harness 14 (shown in phantom in FIG. 2), bladders 102 must be assembled to permit the passage of harness 14 therethrough. In terms of a child safety seat that will incorporate the present invention's cushion system, seat cushion 104 can be assembled in a fashion that accommodates harness 14. Such accommodation is also made possible if bladders 102 are joinable to one another so that seat cushion 104 can be assembled about harness 14. As illustrated by way of non-limiting examples in FIGS. 3A-3C, this could be accomplished by hook-and-loop fastener attachment 200 (FIG. 3A), zippered attachment 202 (FIG. 3B), snap attachment 204 (FIG. 3C), or any other suitable join or attachment system that provides for the accommodation of harness 14.

To make cushion system 100 as safe as possible, it is necessary to safeguard against overinflation of bladders 102 since a child is restrained by harness 14. Accordingly, one or more sensors ("S") 114 (e.g., strain gauges) are coupled to harness 14 to measure the tension therein. Should this tension increase beyond a threshold level, it is possible that bladders 102 are being overinflated (e.g., due to a malfunction, incorrect pressure selection by a parent/caregiver, etc.) thereby pressing the child against harness 14. When this tension threshold is sensed, controller 110 disables compressor 106. Additionally, controller 110 could position all of the valves in central valve system 108 to vent the pressure in bladders 102. Still further, controller 110 can issue an alarm signal that is made visible and/or audible by an alarm device 116.

The advantages of the present invention are numerous. A child in a safety seat can now be optimally supported regardless of the orientation and use of the child safety seat. The support configurations provided by the cushion system can be regulated for maximum child comfort. As a result, the child will be happier when in the child safety seat. When a car seat is equipped with the present invention, the child's comfort translates into general happiness which, in turn, allows a parent/driver of a vehicle to concentrate on driving situations.

Although the invention has been described relative to a specific embodiment thereof, there are numerous variations and modifications that will be readily apparent to those skilled in the art in light of the above teachings. For example, the entirety of seat cushion 104 or each of bladders 102 can be covered with a moisture wicking material to keep the child dry in the seat. Power for the various electric operations of the present invention can be provided by one or more of (i) an onboard battery source which may be rechargeable, (ii) standard AC power, and (iii) a car battery when the cushion system is to be used in a vehicle. It is therefore to be understood that, within the scope of the appended claims, the invention may be practiced other than as specifically described.

What is claimed as new and desired to be secured by Letters Patent of the United States is:

1. A cushion system for use with a child safety seat, comprising:
    a plurality of bladders assembled to form a seat cushion adapted to be (i) positioned in a child safety seat equipped with a safety harness and (ii) cooperative with the safety harness;
    sensing means adapted to be coupled to the safety harness for sensing tension therein and for generating a signal indicative of said tension; and
    pressurizing means for individually pressurizing each of said plurality of bladders wherein a support configuration of said seat cushion is defined, said pressurizing means coupled to said sensing means and responsive to said signal wherein said pressurizing means is disabled when said signal indicates that said tension has attained a threshold level.

2. A cushion system as in claim 1 further comprising a moisture wicking material covering said seat cushion.

3. A cushion system as in claim 1 wherein said pressurizing means comprises:
    a compressor for generating pressurized air;
    valve means coupled between said compressor and each of said plurality of bladders, said valve means having operating positions that permit (i) introduction of said pressurized air from said compressor into selected ones of said plurality of bladders, (ii) egress of said pressurized air from selected ones of said plurality of bladders, and (iii) sealing of said plurality of bladders wherein said pressurized air is retained therein; and a controller coupled to said valve means for controlling said operating positions to achieve said support configuration.

4. A cushion system as in claim 1 wherein said pressurizing means is programmed with a plurality of pre-defined pressures for each of said plurality of bladders wherein a corresponding plurality of support configurations are defined.

5. A cushion system as in claim 1 further comprising user controls coupled to said pressurizing means for receiving instructions governing the pressurizing of each of said plurality of bladders to define said support configuration.

6. A cushion system as in claim 5 wherein said user controls comprise at least one of (i) manually-operated controls, (ii) voice-activated controls, and (iii) remotely-operated controls.

7. A cushion system as in claim 1 further comprising an alarm coupled to said sensing means for generating at least one of an audible alarm and a visible alarm when said signal indicates that said tension has attained a threshold level.

8. A cushion system for use with a child safety seat, comprising:

a plurality of individually-inflatable bladders;

assembly means coupled to said plurality of bladders for facilitating assembly of said plurality of bladders into a seat cushion adapted to be positioned in a child safety seat equipped with a safety harness, said assembly means permitting passage of the safety harness through said seat cushion;

sensing means adapted to be coupled to the safety harness for sensing tension therein and for generating a signal indicative of said tension; and pressurizing means for individually pressurizing each of said plurality of bladders wherein a support configuration of said seat cushion is defined, said pressurizing means coupled to said sensing means and responsive to said signal wherein said pressurizing means is disabled when said signal indicates that said tension has attained a threshold level.

9. A cushion system as in claim 8 further comprising a moisture wicking material covering said seat cushion.

10. A cushion system as in claim 8 wherein said pressurizing means comprises:

a compressor for generating pressurized air;

valve means coupled between said compressor and each of said plurality of bladders, said valve means having operating positions that permit (i) introduction of said pressurized air from said compressor into selected ones of said plurality of bladders, (ii) egress of said pressurized air from selected ones of said plurality of bladders, and (iii) sealing of said plurality of bladders wherein said pressurized air is retained therein; and a controller coupled to said valve means for controlling said operating positions to achieve said support configuration.

11. A cushion system as in claim 8 wherein said pressurizing means is programmed with a plurality of pre-defined pressures for each of said plurality of bladders wherein a corresponding plurality of support configurations are defined.

12. A cushion system as in claim 8 further comprising user controls coupled to said pressurizing means for receiving instructions governing the pressurizing of each of said plurality of bladders to define said support configuration.

13. A cushion system as in claim 12 wherein said user controls comprise at least one of (i) manually-operated controls, (ii) voice-activated controls, and (iii) remotely-operated controls.

14. A cushion system as in claim 8 further comprising an alarm coupled to said sensing means for generating at least one of an audible alarm and a visible alarm when said signal indicates that said tension has attained a threshold level.

15. A cushioned child safety seat, comprising:

a child safety seat having a safety harness;

a plurality of bladders positioned in said child safety seat to form a seat cushion therefor;

sensing means adapted to be coupled to said safety harness for sensing tension therein and for generating a signal indicative of said tension; and pressurizing means for individually pressurizing each of said plurality of bladders wherein a support configuration of said seat cushion is defined, said pressurizing means coupled to said sensing means and responsive to said signal wherein said pressurizing means is disabled when said signal indicates that said tension has attained a threshold level.

16. A cushioned child safety seat as in claim 15 further comprising a moisture wicking material covering said seat cushion.

17. A cushioned child safety seat as in claim 15 wherein said pressurizing means comprises:

a compressor for generating pressurized air;

valve means coupled between said compressor and each of said plurality of bladders, said valve means having operating positions that permit (i) introduction of said pressurized air from said compressor into selected ones of said plurality of bladders, (ii) egress of said pressurized air from selected ones of said plurality of bladders, and (iii) sealing of said plurality of bladders wherein said pressurized air is retained therein; and a controller coupled to said valve means for controlling said operating positions to achieve said support configuration.

18. A cushioned child safety seat as in claim 15 wherein said pressurizing means is programmed with a plurality of pre-defined pressures for each of said plurality of bladders wherein a corresponding plurality of support configurations are defined.

19. A cushioned child safety seat as in claim 15 further comprising user controls coupled to said pressurizing means for receiving instructions governing the pressurizing of each of said plurality of bladders to define said support configuration.

20. A cushioned child safety seat as in claim 19 wherein said user controls comprise at least one of (i) manually-operated controls, (ii) voice-activated controls, and (iii) remotely-operated controls.

21. A cushioned child safety seat as in claim 15 further comprising an alarm coupled to said sensing means for generating at least one of an audible alarm and a visible alarm when said signal indicates that said tension has attained a threshold level.

* * * * *